(12) United States Patent
Kim et al.

(10) Patent No.: US 10,560,923 B2
(45) Date of Patent: *Feb. 11, 2020

(54) METHOD FOR DETERMINING TRANSMISSION RESOURCE BLOCK POOL OF TERMINAL IN D2D COMMUNICATION, AND APPARATUS THEREFOR

(71) Applicant: LG Electronics Inc., Seoul (KR)

(72) Inventors: Youngtae Kim, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/263,608

(22) Filed: Jan. 31, 2019

(65) Prior Publication Data

US 2019/0166587 A1    May 30, 2019

Related U.S. Application Data

(63) Continuation of application No. 15/324,391, filed as application No. PCT/KR2015/008322 on Aug. 7, 2015, now Pat. No. 10,251,161.

(Continued)

(51) Int. Cl.
*H04W 72/04* (2009.01)
*H04L 5/00* (2006.01)

(52) U.S. Cl.
CPC ........... *H04W 72/04* (2013.01); *H04L 5/0012* (2013.01); *H04L 5/0044* (2013.01); *H04L 5/0091* (2013.01)

(58) Field of Classification Search
CPC ............. H04W 72/04; H04W 72/0446; H04W 72/042; H04W 72/0413; H04W 72/048;
(Continued)

(56) References Cited

U.S. PATENT DOCUMENTS

2009/0073929 A1   3/2009  Malladi et al.
2012/0176993 A1   7/2012  Wang et al.
(Continued)

FOREIGN PATENT DOCUMENTS

CN    101425828 A    5/2009
CN    101815325 A    8/2010
(Continued)

OTHER PUBLICATIONS

R1-081226: 3PP TSG RAN WG1 Meeting #52bis, Shenzhen, China, Mar. 31-14, 2008, Samsung, "Correction to UE PUSCH Hopping procedure" pp. 1-4.

(Continued)

*Primary Examiner* — Ian N Moore
*Assistant Examiner* — Brian T Le
(74) *Attorney, Agent, or Firm* — Dentons US LLP

(57) ABSTRACT

Disclosed is a method for determining, by a terminal, a transmission resource pool in device-to-device (D2D) communication. The method for determining a transmission resource pool comprises the steps of: indexing resource blocks within a resource block pool; and mapping the indexed resource blocks to physical resource blocks, wherein the indexed resource blocks are arranged in order of increasing resource block index, the resource block pool is used to transmit D2D signals, and information about the configuration of the resource block pool can be indicated by upper layer signaling.

12 Claims, 14 Drawing Sheets

Related U.S. Application Data

(60) Provisional application No. 62/034,746, filed on Aug. 7, 2014.

(58) Field of Classification Search
CPC ............ H04W 72/0453; H04W 72/044; H04L 5/0012; H04L 5/0053; H04L 5/0094; H04L 5/0037; H04L 5/0073; H04L 5/0057; H04L 5/0055; H04L 1/1861; H04L 5/0044; H04L 5/0091
See application file for complete search history.

(56) References Cited

U.S. PATENT DOCUMENTS

| | | | |
|---|---|---|---|
| 2013/0109301 | A1 | 5/2013 | Hakola et al. |
| 2013/0155962 | A1 | 6/2013 | Hakola et al. |
| 2013/0322345 | A1 | 12/2013 | Vasudevan et al. |
| 2013/0322413 | A1 | 12/2013 | Pelletier et al. |
| 2014/0094183 | A1 | 4/2014 | Gao et al. |
| 2014/0204898 | A1 | 7/2014 | Yang et al. |
| 2015/0324391 | A1 | 11/2015 | Werner |
| 2015/0327315 | A1 | 11/2015 | Xue et al. |

FOREIGN PATENT DOCUMENTS

| | | |
|---|---|---|
| CN | 103841649 A | 6/2014 |
| GB | 2497589 A | 6/2013 |
| WO | 2013181515 A2 | 12/2013 |
| WO | 2014170750 A2 | 10/2014 |
| WO | 2016015664 A1 | 2/2016 |

OTHER PUBLICATIONS

R1-133518: 3GPP TSG-RAN WG1 Meeting #74, Barcelona, Spain, Aug. 19-23, 2013, EADS, "Principles of broadcast D2D communication for public safety" pp. 1-5.

R1-1412293GPP TSG-RAN 1 #76bis, Shenzhen, China, Mar. 31-14, 2014, Fujitsu, "Further analysis on control signal and Scheduling Assignment for D2D communication" pp. 1-7.

R1-1416853GPP TSG RAN WG1 Meeting #76bis, Shenzhen, China, Mar. 31-Apr. 4, 2014, CEWIT, "On Scheduling Assignment Message Design" pp. 1-3.

R1-142233: 3GPP TSG-RAN WG1 #77, Seoul, Korea, May 19-23, 2014, ZTE, "Resource Allocation for Type 2B Discovery" pp. 1-4.

R1-142295: 3GPP TSG-RAN WG1#77, Seoul, Korea, May 19-23, 2014, CEA, IAESI, "D2D physical channels and signals" pp. 1-5.

Ericsson: "Transmission resource allocation control for D2D communication", 3GPP TSG-RAN WG1 Meeting #77, R1-142399, May 19-23, 2014.

LG Electronics: "Discussion on Signaling for D2D Communication Resource Allocation", 3GPP TSG RAN WG1 Meeting #77, R1-142147, May 19-23, 2014.

(a)

(b)

METHOD FOR DETERMINING TRANSMISSION RESOURCE BLOCK POOL OF TERMINAL IN D2D COMMUNICATION, AND APPARATUS THEREFOR

This application is a continuation of U.S. patent application Ser. No. 15/324,391 filed on Jan. 6, 2017, now allowed, which is a National Stage Application of International Application No. PCT/KR2015/008322 filed on Aug. 7, 2015, and claims priority to U.S. Provisional Application No. 62/034,746 filed on Aug. 7, 2014, all of which are hereby incorporated by reference in their entireties as if fully set forth herein.

TECHNICAL FIELD

The present invention relates to a wireless communication system, and more particularly, to a method for determining a transmission resource block pool of a terminal in D2D (Device to Device) communication and an apparatus therefor.

BACKGROUND ART

Recently, with the spread of smartphones and tablet PCs and activation of high-capacity multimedia communication, mobile traffic has significantly increased. Mobile traffic is expected to double every year. Since most mobile traffic is transmitted through a base station (BS), communication service operators are being confronted with serious network load. To process increasing traffic, communication operators have installed networks and accelerated commercialization of next-generation mobile communication standards, such as mobile WiMAX or long term evolution (LTE), capable of efficiently processing large amounts of traffic. However, another solution is required to cope with greater amounts of traffic in the future.

D2D communication refers to decentralized communication technology for directly transmitting traffic between contiguous nodes without using infrastructure such as a BS. In a D2D communication environment, each node of a portable device, etc. searches for physically adjacent devices, configures a communication session, and transmits traffic. Since such D2D communication is being spotlighted as the technological basis of next-generation mobile communication after 4G due to ability thereof to cope with traffic overload by distributing traffic converging upon the BS. For this reason, a standardization institute such as 3rd generation partnership (3GPP) or institute of electrical and electronics engineers (IEEE) is establishing D2D communication standards based on LTE-advanced (LTE-A) or Wi-Fi and Qualcomm etc. have developed independent D2D communication technology.

D2D communication is expected not only to contribute to increased performance of a mobile communication system but also to create a new communication service. Further, an adjacency based social network service or a network game service can be supported. A connectivity problem of a device in a shadow area can be overcome using a D2D link as a relay. Thus, D2D technology is expected to provide new services in various fields.

In fact, D2D communication, such as infrared communication, ZigBee, radio frequency identification (RFID), and near field communication (NFC) based on RFID, has already been widely used. However, strictly speaking, it is difficult for these technologies to be classified as D2D communication for decentralizing traffic of a BS because they support only special communication purposes within a significantly limited distance (around 1 m).

In order to enhance link reliability in D2D communication, frequency hopping may be used. However, a method for performing frequency hopping in D2D communication has not been specifically proposed.

DISCLOSURE

Technical Problem

An object of the present invention devised to solve the problem lies in a method for determining a resource block by performing frequency hopping in D2D communication.

It is another object of the present invention to provide a method for performing frequency hopping in a non-contiguous D2D resource pool.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The object of the present invention can be achieved by providing a method for determining a transmission resource block pool of a terminal in D2D (Device-to-Device) communication, the method including indexing resource blocks in a resource block pool, and mapping the indexed resource blocks to physical resource blocks, wherein the indexed resource blocks may be arranged in ascending order of resource block indexes, and the resource block pool may be used to transmit D2D signals, wherein information on configuration of the resource block pool may be indicated by higher layer signaling.

In another aspect of the present invention, provided herein is a terminal configured to determine a transmission resource block pool in D2D (Device-to-Device) communication, the terminal including a radio frequency unit, and a processor configured to control the radio frequency unit, the processor being further configured to index resource blocks in a resource block pool, wherein the indexed resource blocks may be arranged in ascending order of resource block indexes, and the resource block pool may be used to transmit D2D signals, wherein information on configuration of the resource block pool may be indicated by higher layer signaling.

Advantageous Effects

According to embodiments of the present invention, D2D frequency hopping may be performed using conventional LTE type 1/2 PUSCH hopping.

According to embodiments of the present invention, frequency hopping may be performed between different frequency resources to obtain improved frequency diversity.

It will be appreciated by persons skilled in the art that the effects that may be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

BEST MODE

Figure 1:
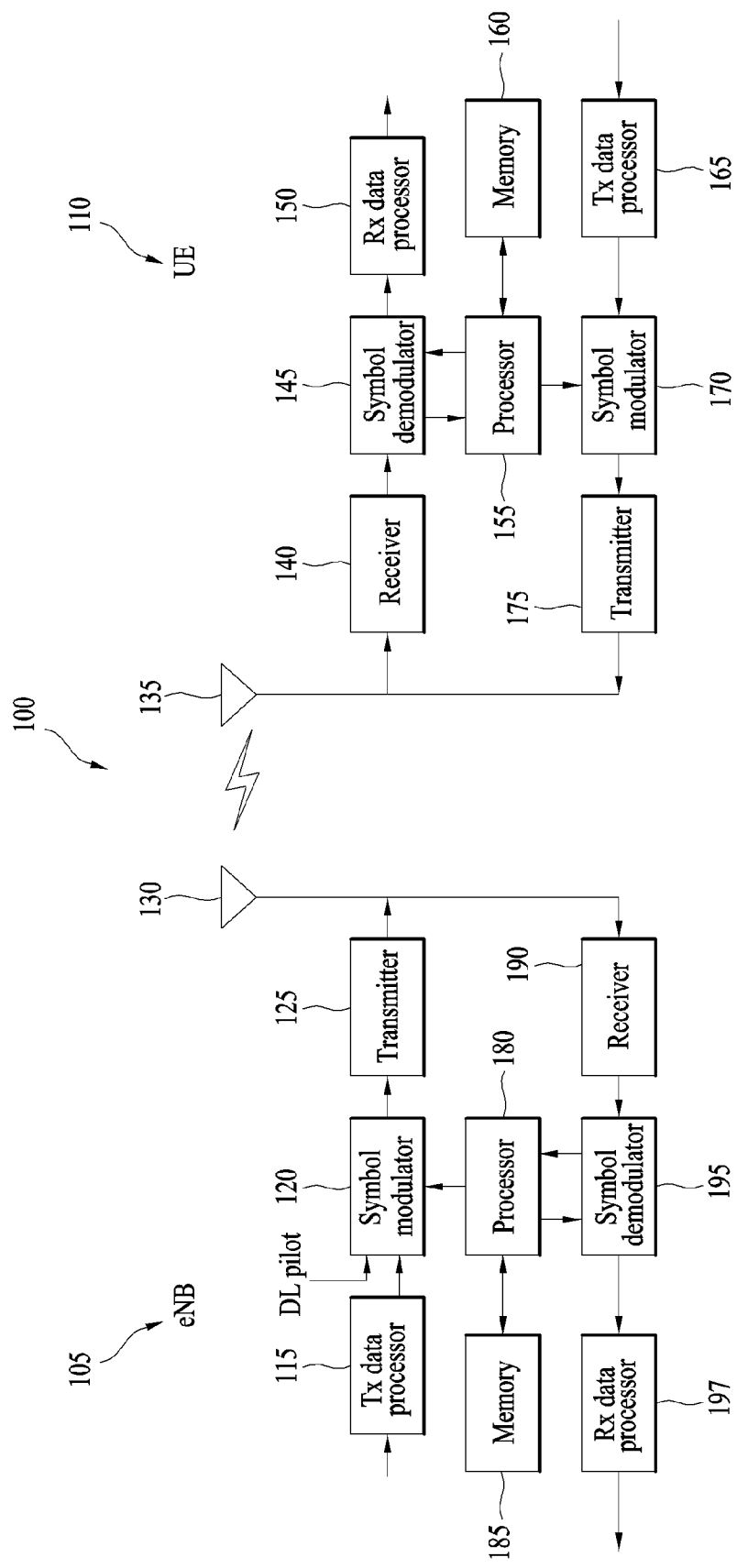
FIG. 1 is a block diagram illustrating configurations of a eNB (BS) and a user equipment (UE) in a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station BS and a user equipment UE. In this case, the base station BS means a terminal node of a network, which performs direct communication with the user equipment UE. A specific operation which has been described as being performed by the base station may be performed by an upper node of the base station BS as the case may be.

In other words, it will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

Specific terms used for the embodiments of the present invention are provided to help the understanding of the present invention. These specific terms may be replaced with other terms within the scope and spirit of the present invention.

FIG. 1 is a block diagram illustrating configurations of a base station 105 and a user equipment 110 in a wireless communication system.

Although one base station 105 and one user equipment (e.g., D2D UE) 110 are shown for simplification of a wireless communication system 100, the wireless communication system 100 may include one or more base stations and/or one or more user equipments.

Referring to FIG. 1, the base station 105 may include a transmitting (Tx) data processor 115, a symbol modulator 120, a transmitter 125, a transmitting and receiving antenna 130, a processor 180, a memory 185, a receiver 190, a symbol demodulator 195, and a receiving (Rx) data processor 297. The user equipment 110 may include a Tx data processor 165, a symbol modulator 170, a transmitter 175, a transmitting and receiving antenna 135, a processor 155, a memory 160, a receiver 140, a symbol demodulator 155, and an Rx data processor 150. Although the antennas 130 and 135 are respectively shown in the base station 105 and the user equipment 110, each of the base station 105 and the user equipment 110 includes a plurality of antennas. Accordingly, the base station 105 and the user equipment 110 according to the present invention support a multiple input multiple output (MIMO) system. Also, the base station 105 according to the present invention may support both a single user-MIMO (SU-MIMO) system and a multi user-MIMO (MU-MIMO) system.

On a downlink, the Tx data processor 115 receives traffic data, formats and codes the received traffic data, interleaves and modulates (or symbol maps) the coded traffic data, and provides the modulated symbols ("data symbols"). The symbol modulator 120 receives and processes the data symbols and pilot symbols and provides streams of the symbols.

The symbol modulator 120 multiplexes the data and pilot symbols and transmits the multiplexed data and pilot symbols to the transmitter 125. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 receives the streams of the symbols and converts the received streams into one or more analog symbols. Also, the transmitter 125 generates downlink signals suitable for transmission through a radio channel by additionally controlling (for example, amplifying, filtering and frequency upconverting) the analog signals. Subsequently, the downlink signals are transmitted to the user equipment through the antenna 130.

In the configuration of the user equipment 110, the antenna 135 receives the downlink signals from the base station 105 and provides the received signals to the receiver 140. The receiver 140 controls (for example, filters, amplifies and frequency downcoverts) the received signals and digitalizes the controlled signals to acquire samples. The symbol demodulator 145 demodulates the received pilot symbols and provides the demodulated pilot symbols to the processor 155 to perform channel estimation.

Also, the symbol demodulator 145 receives a frequency response estimation value for the downlink from the processor 155, acquires data symbol estimation values (estimation values of the transmitted data symbols) by performing data demodulation for the received data symbols, and provides the data symbol estimation values to the Rx data processor 150. The Rx data processor 50 demodulates (i.e., symbol de-mapping), deinterleaves, and decodes the data symbol estimation values to recover the transmitted traffic data.

Processing based on the symbol demodulator 145 and the Rx data processor 150 is complementary to processing based on the symbol demodulator 120 and the Tx data processor 115 at the base station 105.

On an uplink, the Tx data processor 165 of the user equipment 110 processes traffic data and provides data symbols. The symbol modulator 170 receives the data symbols, multiplexes the received data symbols with the pilot symbols, performs modulation for the multiplexed symbols, and provides the streams of the symbols to the transmitter 175. The transmitter 175 receives and processes the streams of the symbols and generates uplink signals. The uplink signals are transmitted to the base station 105 through the antenna 135.

The uplink signals are received in the base station 105 from the user equipment 110 through the antenna 130, and the receiver 190 processes the received uplink signals to acquire samples. Subsequently, the symbol demodulator 195 processes the samples and provides data symbol estimation values and the pilot symbols received for the uplink. The Rx data processor 197 recovers the traffic data transmitted from the user equipment 110 by processing the data symbol estimation values.

The processors 155 and 180 of the user equipment 110 and the base station 105 respectively command (for example, control, adjust, manage, etc.) the operation at the user equipment 110 and the base station 105. The processors 155 and 180 may respectively be connected with the memories 160 and 185 that store program codes and data. The memories 160 and 185 respectively connected to the processor 180 store operating system, application, and general files therein.

Each of the processors 155 and 180 may be referred to as a controller, a microcontroller, a microprocessor, and a microcomputer. Meanwhile, the processors 155 and 180 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 155 and 180.

Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 155 and 180, or may be stored in the memories 160 and 185 and driven by the processors 155 and 180.

Layers of a radio interface protocol between the user equipment 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel A radio resource control (RRC) layer belongs to the third layer and provides control radio resources between the user equipment and the network. The user equipment and the base station may exchange RRC messages with each another through the RRC layer.

While the UE processor 155 enables the UE 110 to receive signals and can process other signals and data, and the BS processor 180 enables the BS 105 to transmit signals and can process other signals and data, the processors 155 and 180 will not be specially mentioned in the following description. Although the processors 155 and 180 are not specially mentioned in the following description, it should be noted that the processors 155 and 180 can process not only data transmission/reception functions but also other operations such as data processing and control.

LTE/LET-A Resource Structure/Channel

Figure 2:
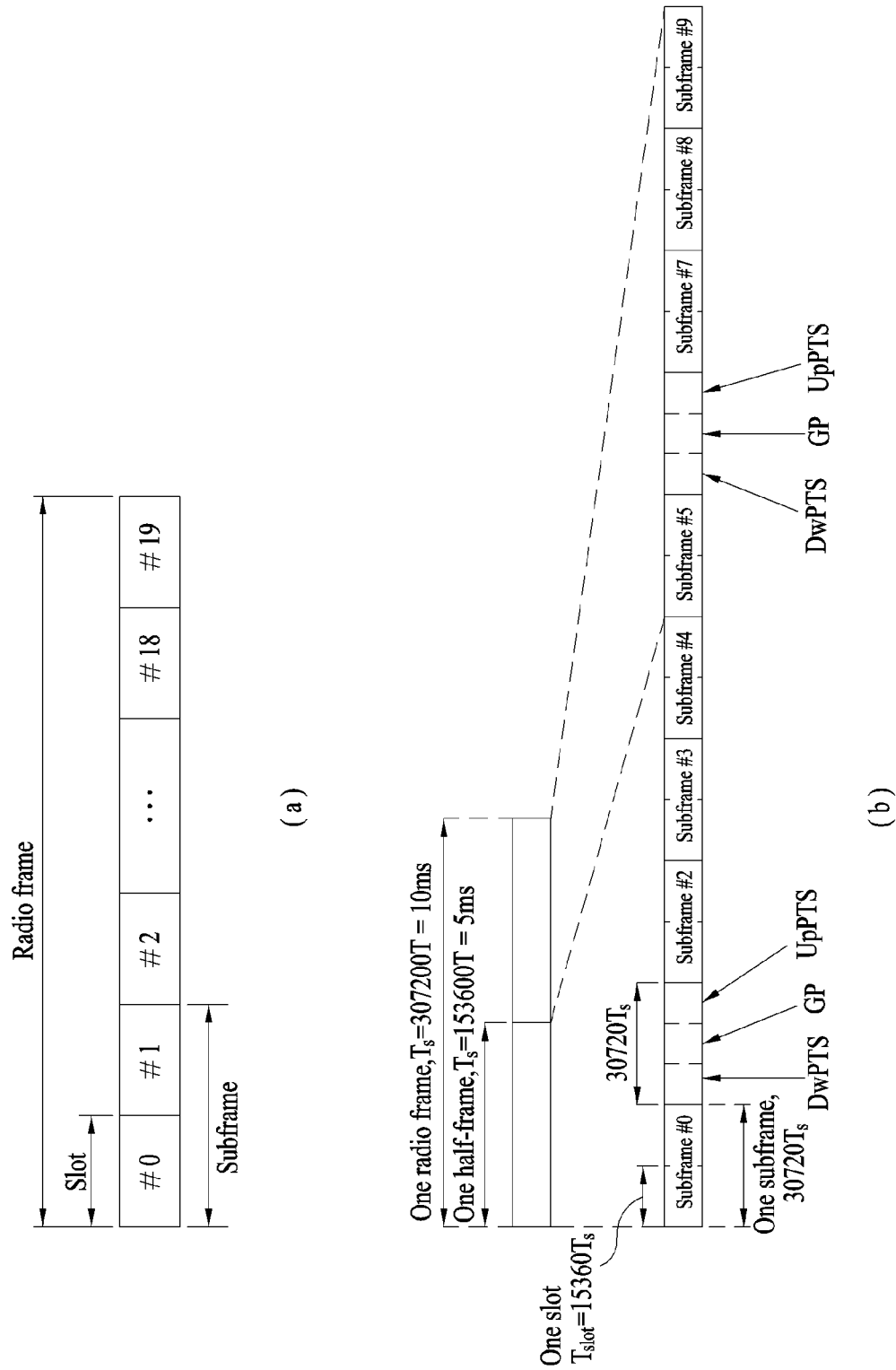
FIG. 2 exemplarily shows a radio frame structure.

Hereinafter, a DL radio frame structure will be described with reference to FIG. 2.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD). Particularly, FIG. 2(a) shows a frame structure for frequency division duplex (TDD) used in 3GPP LTE/LTE-A and FIG. 2(b) shows a frame structure for time division duplex (TDD) used in 3GPP LTE/LTE-A.

FIG. 2(a) illustrates the type-1 radio frame structure. A radio frame has a length of 10 ms (327200×$T_s$) and is composed of 10 equal sized subframes. Each subframe has a length of 1 ms and is composed of two slots. Each slot has a length of 0.5 ms (15360×c). Here, $T_s$ denotes the sampling time, and is represented by $T_s=1/(15 \text{ kHz} \times 2048)=3.2552 \times 10^{-8}$ (about 33 ns). A slot includes a plurality of OFDM symbols in the time domain and a plurality of resource blocks (RB) in the frequency domain. In the LTE system, one resource block includes 12 subcarriers×7 (6) OFDM symbols. 20 slots in one radio frame may be sequentially numbered from 0 to 19. Each slot has a length of 0.5 ms. The time for transmitting one subframe is defined as a transmission time interval (TTI). The time resource may be classified by a radio frame number (or a radio frame index), a subframe number (or a subframe index), a slot number (or a slot index), and the like.

FIG. 2(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The radio frame may be configured differently according to the duplex mode. For example, in the frequency division duplex (FDD) mode, downlink transmission and uplink transmission are divided by frequency, and thus the radio frame includes only one of the downlink subframe and the uplink subframe for a specific frequency band. In the TDD mode, since the downlink transmission and the uplink transmission are divided by time, the radio frame includes both the downlink subframe and the uplink subframe for a specific frequency band.

Table 1 illustrates DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe, and S denotes a special subframe. The specific subframe includes three fields of Downlink Pilot Time Slot (DwPTS), Guard Period (GP), and Uplink Pilot Time Slot (UpPTS). DwPTS is a time interval reserved for downlink transmission, and UpPTS is a time interval reserved for uplink transmission. Table 2 illustrates configurations of the specific frame.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  | 4384 · $T_s$ | 5120 · $T_s$ |
| 5 | 6592 · $T_s$  | 4384 · $T_s$ | 5120 · $T_s$ | 20480 · $T_s$ |              |              |

TABLE 2-continued

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The above-described radio frame structure is merely an example, and the number of subframes included in a radio frame, the number of slots included in a subframe, and the number of symbols included in a slot is variable.

Figure 3:
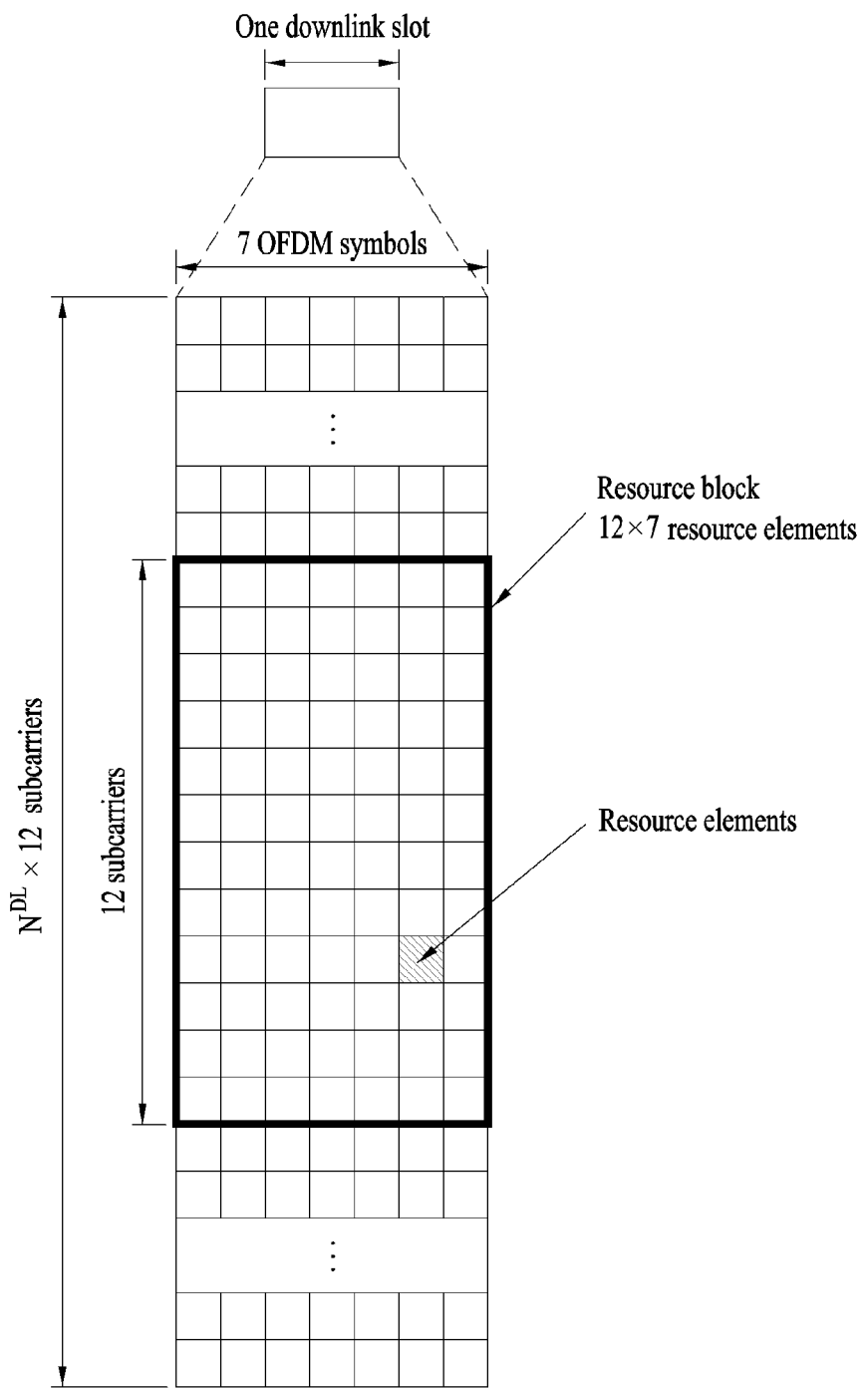
FIG. 3 exemplarily shows a resource grid of one downlink slot.

FIG. 3 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 4:
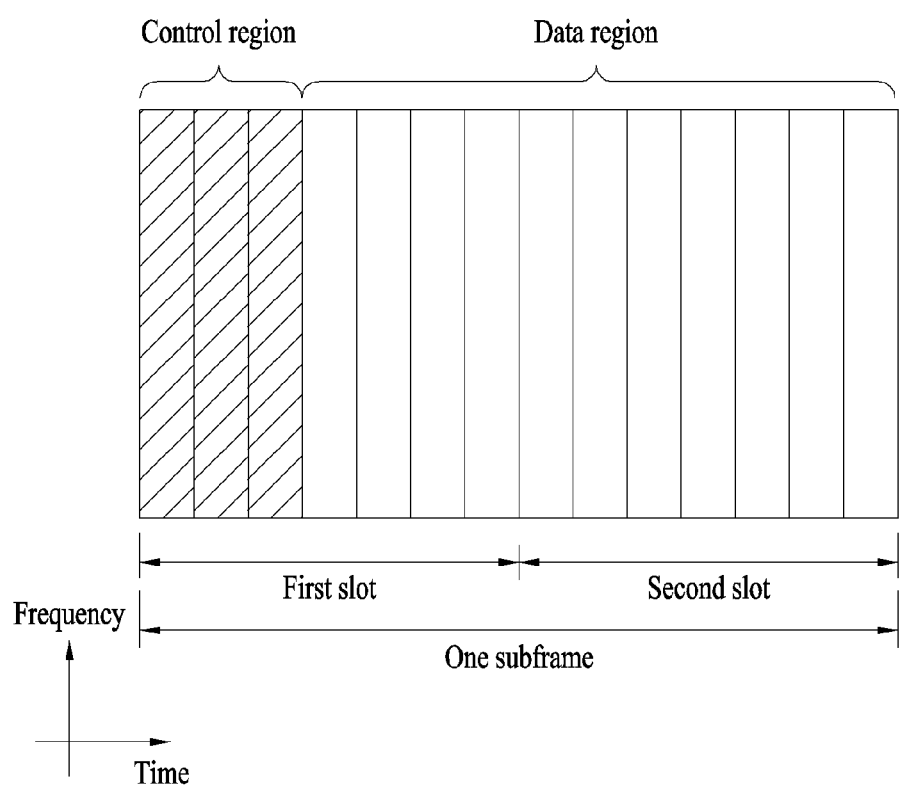
FIG. 4 exemplarily shows a downlink (DL) subframe structure.

FIG. 4 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more contiguous Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 5:
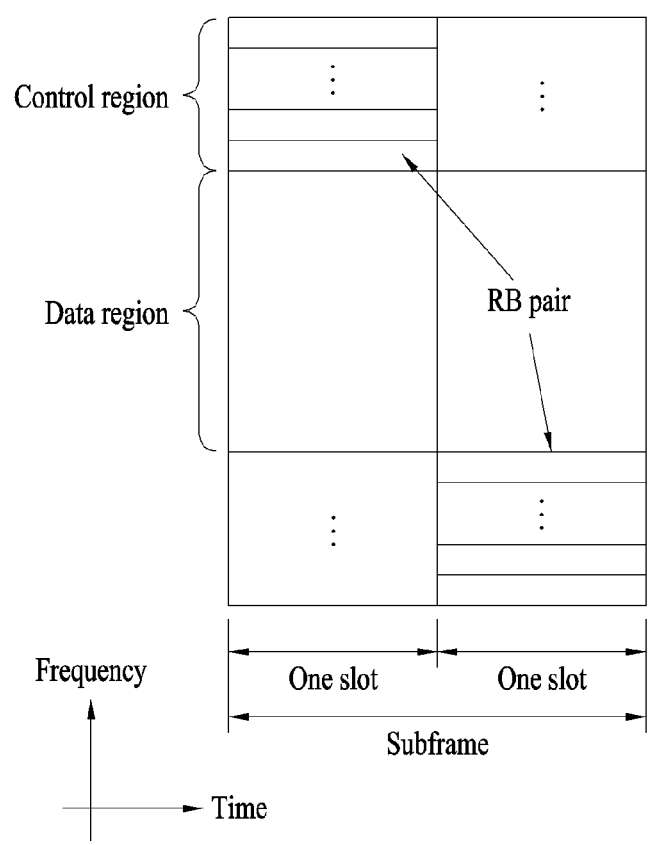
FIG. 5 exemplarily shows an uplink (UL) subframe structure.

FIG. 5 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Multiple Antenna System

In the multiple antenna technology, reception of one whole message does not depend on a single antenna path. Instead, in the multiple antenna technology, data fragments received through multiple antennas are collected and combined to complete data. If the multiple antenna technology is used, a data transfer rate within a cell region of a specific size may be improved, or system coverage may be improved while ensuring a specific data transfer rate. In addition, this technology may be broadly used by mobile communication devices and relays. Due to the multiple antenna technology, restriction on mobile communication traffic based on a legacy technology using a single antenna may be solved.

Figure 6:
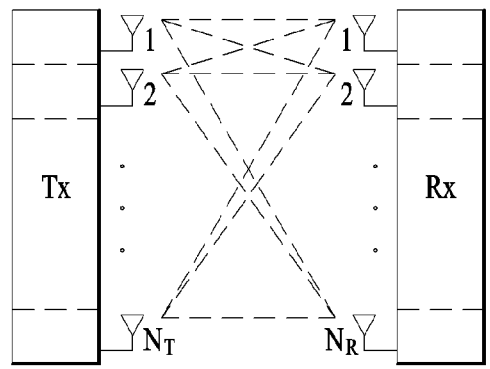
FIG. 6 is a diagram for a configuration of a general MIMO communication system.
Figure 6:
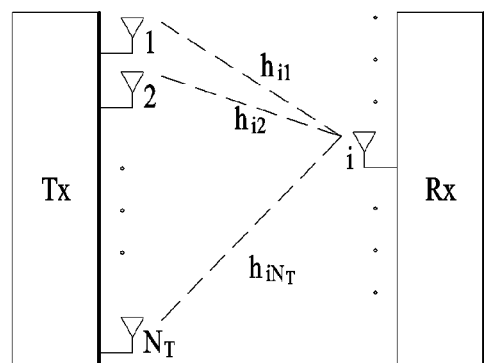

FIG. 6(a) shows the configuration of a wireless communication system including multiple antennas. As shown in FIG. 6(a), the number of transmit (Tx) antennas and the number of Rx antennas respectively to NT and NR, a theoretical channel transmission capacity of the MIMO communication system increases in proportion to the number of antennas, differently from the above-mentioned case in which only a transmitter or receiver uses several antennas, so that transmission rate and frequency efficiency may be greatly increased. In this case, the transfer rate acquired by the increasing channel transmission capacity may theoretically increase by a predetermined amount that corresponds to multiplication of a maximum transfer rate (Ro) acquired when one antenna is used and a rate of increase (Ri). The rate of increase (Ri) may be represented by the following equation 1.

$$R_i = \min(N_T, N_R) \quad \text{Equation 1}$$

For example, provided that a MIMO system uses four Tx antennas and four Rx antennas, the MIMO system may theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which may substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As may be seen from FIG. 6(a), it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information may be represented by a specific vector shown in the following equation 2.

$$s = [s_1, s_2, \ldots, s_{N_T}]^T \quad \text{Equation 2}$$

In the meantime, individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power may be represented by a specific vector shown in the following equation 3.

$$\hat{s} = [\hat{s}_1, \hat{s}_2, \ldots, \hat{s}_{N_T}]^T = [Ps_1, Ps_2, \ldots, Ps_{N_T}]^T \quad \text{Equation 3}$$

In Equation 3, $\hat{s}$ is a transmission vector, and may be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

In the meantime, the information vector $\hat{s}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ may be represented by the following equation 5 using the vector X. Here, $W_{ij}$ denotes a weight corresponding to i-th Tx antenna and j-th information. W represents a weight matrix or precoding matrix.

$$x = \begin{bmatrix} x_1 \\ x_2 \\ \vdots \\ x_i \\ \vdots \\ x_{N_T} \end{bmatrix} \quad \text{Equation 5}$$

$$= \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \quad \text{Equation 6}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and matrices by grouping them. Examples of vector expressions are given as below. FIG. 6(b) illustrates channels from $N_T$ Tx antennas to an $i^{th}$ Rx antenna.

As illustrated in FIG. 6(b), the channels from the $N_T$ Tx antennas to an $i^{th}$ Rx antenna may be expressed as follows.

$$h_i^T = [h_{i1}, h_{i2}, \ldots, h_{iN_T}] \quad \text{Equation 7}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} \quad \text{Equation 8}$$

$$= \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R} & h_{N_R 2} & \cdots & h_{N_R N_T} \end{bmatrix}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{Equation 9}$$

From the above modeled equations, the received signal may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \vdots \\ h_{i2} & h_{i2} & \cdots & h_{iN_T} \\ \vdots & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

Equation 10

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$. In general, the rank of a matrix is defined as the smaller between the numbers of independent rows and columns. Accordingly, the rank of the matrix is not larger than the number of rows or columns. The rank of the matrix H, rank (H) is limited as follows.

$$\text{rank}(H) \leq \min(N_T, N_R)$$

Equation 11

As a multi-antenna transmission and reception scheme used for operating a multi-antenna system, it may be able to use FSTD (frequency switched transmit diversity), SFBC (Space Frequency Block Code), STBC (Space Time Block Code), CDD (Cyclic Delay Diversity), TSTD (time switched transmit diversity) and the like. In a rank 2 or higher, SM (Spatial Multiplexing), GCDD (Generalized Cyclic Delay Diversity), S-VAP (Selective Virtual Antenna Permutation) and the like may be used.

The FSTD corresponds to a scheme of obtaining a diversity gain by assigning a subcarrier of a different frequency to a signal transmitted by each of multiple antennas. The SFBC corresponds to a scheme capable of securing both a diversity gain in a corresponding dimension and a multi-user scheduling gain by efficiently applying selectivity in a spatial domain and a frequency domain. The STBC corresponds to a scheme of applying selectivity in a spatial domain and a time domain. The CDD corresponds to a scheme of obtaining a diversity gain using path delay between transmission antennas. The TSTD corresponds to a scheme of distinguishing signals transmitted by multiple antennas from each other on the basis of time. The spatial multiplexing (SM) corresponds to a scheme of increasing a transfer rate by transmitting a different data according to an antenna. The GCDD corresponds to a scheme of applying selectivity in a time domain and a frequency domain. The S-VAP corresponds to a scheme of using a single precoding matrix. The S-VAP may be classified into an MCW (multi codeword) S-VAP for mixing multiple codewords between antennas in spatial diversity or spatial multiplexing and an SCW (single codeword) S-VAP for using a single codeword.

Reference Signal Received Power (RSRP)

RSRP is defined as the linear average of powers of resource elements that carry a cell-specific RS (CRS) within a measured frequency bandwidth. The UE may determine RSRP by detecting a cell-specific reference signal (CRS) mapped onto a specific resource element and transmitted. The RSRP calculation may basically use CRS R0 for antenna port 0. If the terminal is capable of reliably detecting CRS R1 for antenna port 1, the UE may determine RSRP using R1 as well as R0. For details of the CRS, a standard document (e.g., 3GPP TS36.211) may be referenced.

Received Signal Strength Indicator (RSSI)

RSSI may be defined as the total received wideband power from all sources including co-channel serving and non-serving cells, adjacent channel interference and thermal noise in a measurement band observed by the UE. The RSSI may be used as an input to a reference signal reception quality (RSRQ) to be described later.

Reference Signal Received Quality (RSRQ)

RSRQ, which is intended to provide cell-specific signal quality characteristics, is similar to RSRP, but may be mainly used to rank different LTE candidate cells according to the signal quality of each cell. For example, if the RSRP measurement provides information that is not sufficient to perform a reliable mobility determination, the RSRQ measurement may be used as an input for handover and cell reselection decisions. RSRQ is a value obtained by dividing a value obtained by multiplying the number N of resource blocks in the frequency bandwidth by the LTE carrier RSSI (i.e., RSRQ=N×RSRP/(E-UTRA carrier RSSI)). The numerator (N×RSRP) and denominator (E-UTRA carrier RSSI) are measured for the same set of resource blocks. While RSRP is an indicator of the desired signal strength, RSRQ may be able to report the combined effect of signal strength and interference in an effective way by considering the level of interference included in the RSSI.

Reference Signal (RS)

In a mobile communication system, a packet is transmitted through a wireless channel, and thus signal distortion may occur. In order to correct a distorted signal on the receiving side, the receiving side needs to know the channel information. Therefore, in order to find the channel information, the transmitting side transmits a signal known to both the transmitting side and the receiving side and the receiving side finds the information of the channel based on the degree of distortion of the received signal. In this case, a signal known to both the transmitting side and the receiving side is referred to as a pilot signal or a reference signal (RS). Also, in a wireless communication in which a multi-antenna (MIMO) technique is applied, a separate reference signal exists for each transmission antenna.

In a mobile communication system, reference signals may be classified into a reference signal for obtaining channel information and a reference signal for data demodulation. Since the reference signal for obtaining channel information is intended for a UE to acquire channel information on the downlink, it is transmitted in a wideband. The UE that does not receive downlink data in a specific subframe should also be allowed to receive and measure this RS. Also, the reference signal for acquisition of channel information may be used for channel state measurement for handover. The reference signal for data demodulation is a reference signal sent together with downlink data on a downlink resource when an eNB sends the downlink data, and the terminal may perform channel estimation and demodulate the data by receiving this reference signal. The reference signal for demodulation is transmitted in the region where data is transmitted.

In the LTE system, two kinds of downlink reference signals are defined for a unicast service: a common RS (CRS) for acquisition of information on the channel condition and measurement of, for example, handover, and a UE-specific reference signal used for data demodulation. In the LTE system, the UE-specific RS is used only for data demodulation and the CRS may be used for both acquisition of channel information and data demodulation. The CRS is a cell-specific signal, and may be transmitted every subframe in the case of a wideband.

In LTE-A (LTE-Advanced), a reference signal capable of supporting a maximum of 8 transmit antennas is required. In order to support 8 transmit antennas while maintaining backward compatibility with the LTE system, another reference signal for 8 transmit antennas needs to be additionally defined in the time-frequency region in which a CRS defined in LTE is transmitted in every subframe in all bands. However, when a reference signal for up to 8 antennas is added to the LTE-A system in the same manner as the CRS of legacy LTE, overhead is excessively increased due to the reference signal. Therefore, in LTE-A, a channel state information-RS (CSI-RS) used for channel measurement for selecting a Modulation and Coding Scheme (MCS) and a Precision Matrix Indicator and a DM-RS for data demodulation have been introduced. Unlike the legacy CRS, which is used for demodulation of data as well as measurements such as channel measurements and handover, the CSI-RS is transmitted only for the purpose of obtaining information on channel states. Therefore, the CSI-RS may not be transmitted every subframe. In order to reduce overhead caused by the CSI-RS, the CSI-RS is transmitted intermittently in the time domain, and the DM-RS for the corresponding UE is transmitted for data demodulation. Therefore, the DM-RS of a specific terminal is transmitted only in the scheduled region, i.e., in the time-frequency region in which the specific UE receives the data.

Figure 7:
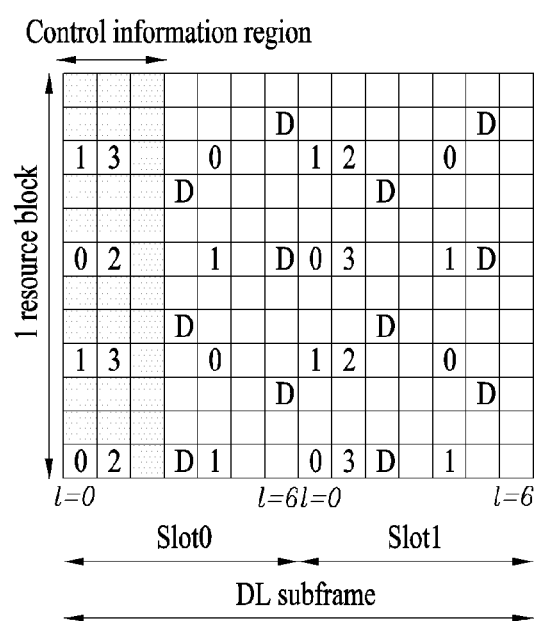
FIG. 7 is a diagram illustrating a structure of a downlink reference signal for a normal CP in an LTE system supporting downlink transmission using four antennas.
Figure 8:
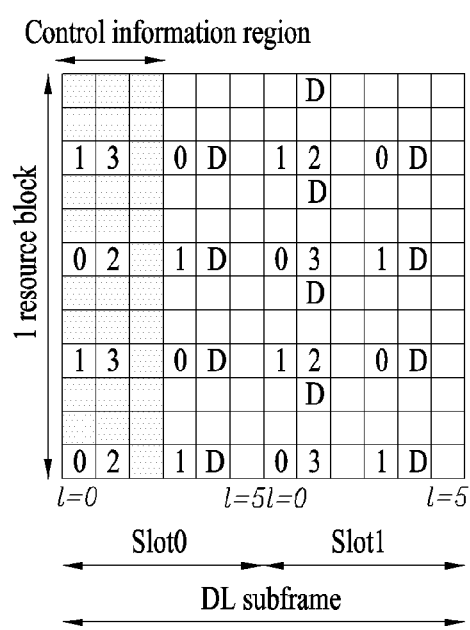
FIG. 8 is a diagram illustrating a structure of a downlink reference signal for an extended CP in an LTE system supporting downlink transmission using four antennas.

FIGS. 7 and 8 are diagrams showing a structure of a reference signal in the LTE system supporting downlink transmission using four antennas. Particularly, FIG. 7 illustrates a case of a normal cyclic prefix, and FIG. 8 illustrates a case of an extended cyclic prefix.

Referring to FIGS. 7 and 8, numerals 0 to 3 in the grid indicate Common Reference Signals (CRSs), which are cell-specific reference signals transmitted for channel measurement and data demodulation corresponding to each of antenna ports 0 to 3, The CRS, which is a cell specific reference signal, may be transmitted to the UE over the control information region as well as the data information region.

In addition, 'D' in the grid denotes a downlink demodulation-RS (DM-RS), which is a UE-specific RS, and the DM-RS supports single antenna port transmission through a data region, i.e., PDSCH. The UE receives a signal indicating whether there is a DM-RS, which is a UE-specific RS, through an higher layer. FIGS. 7 and 8 illustrate a DM-RS corresponding to antenna port 5, and the 3GPP standard document 36.211 also defines a DM-RS for antenna ports 7 to 14, i.e. 8 antenna ports.

For example, a rule for mapping of a reference signal to a resource block may be given by the following equation.

In the case of CRS, the reference signal may be mapped according to Equation 12 below.

$$k = 6m + (v + v_{shift}) \bmod 6 \qquad \text{Equation 12}$$

$$l = \begin{cases} 0, N_{symb}^{DL} & \text{if } p \in \{0, 1\} \\ 1 & \text{if } p \in \{2, 3\} \end{cases}$$

$$m = 0, 1, \cdots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In addition, the dedicated RS (DRS) may be mapped according to Equation 13.

Equation 13 normal CP:
$$k = (k') \bmod N_{SC}^{RB} + N_{SC}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & n_s \bmod 2 = 0 \\ 2, 3 & n_s \bmod 2 = 1 \end{cases}$$

$$m' = 0, 1, \cdots, 3N_{RB}^{PDSCH} - 1$$

Extended CP:
$$k = (k') \bmod N_{SC}^{RB} + N_{SC}^{RB} \cdot n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & n_s \bmod 2 = 0 \\ 1, 2 & n_s \bmod 2 = 1 \end{cases}$$

$$m' = 0, 1, \cdots, 4N_{RB}^{PDSCH} - 1$$

$$v_{shift} = N_{ID}^{cell} \bmod 3$$

In Equations 12 and 13, k denotes a subcarrier index and p denotes an antenna port. In addition, $N_{DL}^{RB}$ denotes the number of resource blocks allocated to downlink, $n_s$ denotes a slot index, and $N_{ID}^{cell}$ denotes a cell ID.

In the LTE-A system, the eNB transmits a CSI-RS for all antenna ports. As described above, the CSI-RS may be transmitted intermittently in the time domain. For example, the CSI-RS may be periodically transmitted with a period of an integer multiple of one subframe, or may be transmitted in a specific transmission pattern. In this case, the period/pattern in which the CSI-RS is transmitted may be set by the eNB. In order to measure a channel using the CSI-RS, the UE needs to identify a CSI-RS transmission subframe index for the CSI-RS antenna port of a cell to which the UE belongs, time-frequency positions of CSI-RS elements in the transmission subframe, a CSI-RS sequence, and the like.

In the LTE-A system, the resources used for CSI-RS transmission of different antenna ports are orthogonal to each other. When an eNB transmits CSI-RSs for different antenna ports, the CSI-RSs for the respective antenna ports may be mapped to different resource elements, such that the resource elements are allocated so as to be orthogonal to each other in a manner of FDM/TDM. In addition, the eNB may transmit the CSI-RSs by code division multiplexing by mapping CSI-RSs for different antenna ports using orthogonal codes.

Figure 9:
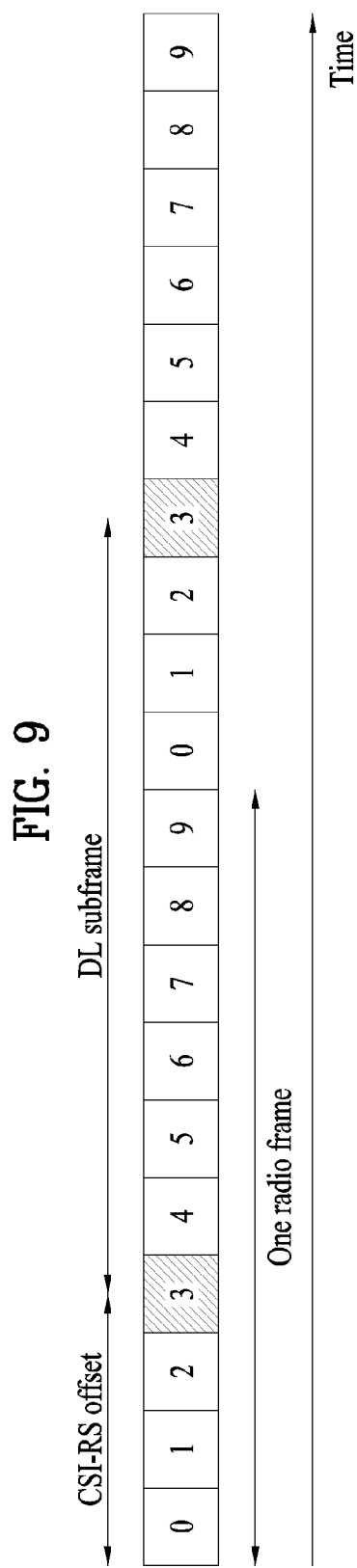
FIG. 9 illustrates an example of a periodic CSI-RS transmission scheme.

FIG. 9 illustrates an example of a periodic CSI-RS transmission scheme. In FIG. 9, the CSI-RS is transmitted at a period of 10 ms, and the offset is 3. A different offset value may be provided for each eNB such that the CSI-RSs of multiple cells may be evenly distributed. When the CSI-RS is transmitted at a period of 10 ms, the eNB may have 10 offset values from 0 to 9. The offset represents an index value of a subframe in which an eNB having a specific period starts CSI-RS transmission. When the eNB informs the UE of the CSI-RS period and offset value, the UE measures the CSI-RS of the eNB at the corresponding position using the corresponding value, and reports information such as CQI/PMI/RI to the eNB. The information associated with the CSI-RS is all cell-specific information.

Figure 10:
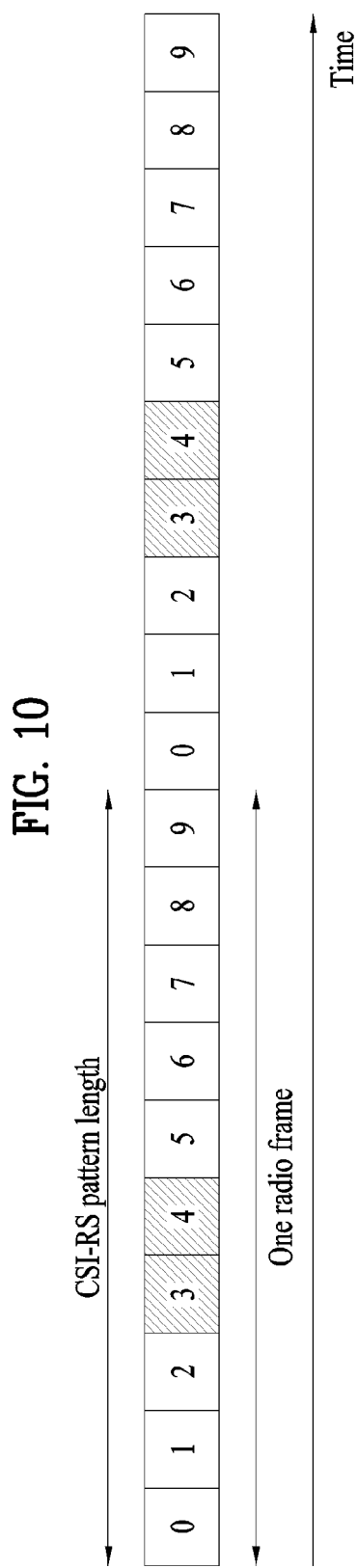
FIG. 10 illustrates an example of an aperiodic CSI-RS transmission scheme.

FIG. 10 illustrates an example of an aperiodic CSI-RS transmission scheme. In FIG. 10, the eNB transmits a CSI-RS in subframe indexes 3 and 4. The transmission pattern is composed of 10 subframes. Whether the CSI-RS is transmitted in each subframe may be designated by a bit indicator.

Generally, two methods are considered as a method for the eNB to inform the UE of the CSI-RS configuration.

First, the eNB may transmit a CSI-RS configuration using a Dynamic Broadcast CHannel (DBCH) signaling for broadcasting the CSI-RS configuration information to UEs. In the LTE system, a Broadcasting Channel (BCH) is used to inform the UE of the content of the system information. However, if not all the information can be transmitted over the BCH because the amount of the information is large, the information is transmitted in the same manner as typical data, and the PDCCH of the data is CRC-masked with SI-RNTI (System Information RNTI) rather than with a specific UE ID. In this case, the actual system information is transmitted in the PDSCH area like general unicast data. All the UEs in the cell may decode the PDCCH using the SI-RNTI and then decode a PDSCH indicated by the PDCCH to acquire the system information. The broadcasting scheme of this type is distinguished from the typical broadcasting scheme corresponding to the physical BCH (PBCH) and is referred to as a DBCH. System information broadcast in the LTE system is a Master Information Block (MIB) transmitted on the PBCH and a System Information Block (SIB) multiplexed with typical unicast data and transmitted on the PDSCH. Newly introduced SIB9 in LTE-A. The CSI-RS configuration may be transmitted using SIB 9 or SIB 10, which is newly introduced in LTE-A.

In addition, the eNB may transmit CSI-RS related information to the UE using Radio Resource Control (RRC) signaling. In establishing a connection with an eNB through initial access or handover over, the eNB may transmit the CSI-RS configuration to the UE using RRC signaling. Also, the eNB may transmit CSI-RS configuration information to the UE through an RRC signaling message for requesting feedback based on the CSI-RS measurement.

Hereinafter, various embodiments in which a UE performs device to device communication (hereinafter, referred to as D2D communication or D2D direct communication) will be described. In describing D2D communication, 3GPP LTE/LTE-A will be described as an example, but D2D communication may be also applied to other communication systems (IEEE 802.16, WiMAX, etc.).

D2D Communication Type

D2D communication may be classified into network coordinated D2D communication and autonomous D2D communication depending on whether D2D communication is performed through control of the network. Network coordinated D2D communication may be classified into a type (data only in D2D) in which D2D transmits data only and a type in which the network performs connection control only (connection control only in network) according to the degree of intervention of the network. For simplicity, a type in which D2D transmits data only is referred to as a 'network-concentrated D2D communication' and a type in which the network performs connection control only is referred to as 'distributed D2D communication'.

In the network-concentrated D2D communication, only data is exchanged between D2D UEs, and connection control and radio resource allocation (grand message) between D2D UEs are performed by the network. The D2D UEs may use radio resources allocated by the network to transmit/receive data or specific control information. For example, HARQ ACK/NACK feedback or channel state information (CSI) for data reception between D2D UEs may not be directly exchanged between D2D UEs, but may be transmitted to other D2D UEs over a network. Specifically, when the network establishes a D2D link between D2D UEs and allocates radio resources to the established D2D link, a transmitting D2D UE and a receiving D2D UE may perform D2D communication using the allocated radio resources. That is, in the network-concentrated D2D communication, the D2D communication between the D2D UEs is controlled by the network, and the D2D UEs may perform D2D communication using the radio resources allocated by the network.

The network in the distributed D2D communication plays a more limited role than the network in the network-concentrated D2D communication. In the distributed D2D communication, the network performs connection control between D2D UEs, but radio resource allocation (grant message) between D2D UEs may be occupied by the D2D UEs through contention without the help of the network. For example, HARQ ACK/NACK feedback for data reception between D2D UEs or channel state information may be directly exchanged between D2D UEs without passing through the network.

As in the above example, the D2D communication may be classified into the network-concentrated D2D communication type and the distributed D2D communication type according to the degree of intervention of the network in D2D communication. A common feature of the network-concentrated D2D communication type and the distributed D2D communication type is that D2D connection control may be performed by the network.

Specifically, the network in the network cooperative D2D communication may establish a connection between D2D UEs by establishing a D2D link between the D2D UEs to perform D2D communication. In establishing the D2D link between the D2D UEs, the network may assign a physical D2D link identifier (LID) to the established D2D link. The physical D2D link ID may be used as an identifier for identifying each D2D link when a plurality of D2D links exist between the multiple D2D UEs.

In the autonomous D2D communication, the D2D UEs may freely perform the D2D communication without the help of the network unlike the network-concentrated and distributed D2D communication types. That is, unlike the network-concentrated and distributed D2D communication, in the autonomous D2D communication, the D2D UE autonomously performs access control and occupation of radio resources. If necessary, the network may provide D2D channel information to the D2D UEs for use in a corresponding cell.

Configuration of D2D Communication Link

For simplicity, a UE that performs or is capable of performing D2D communication, which is direct communication between UEs, will be referred to as a D2D UE in the following description. Further, in the following description, "UE" may refer to a D2D UE. When it is necessary to distinguish between the transmitting end and the receiving end, a D2D UE that transmits or desires to transmit data to another D2D UE using a radio resource assigned to a D2D link in the D2D communication will be referred to as a transmitting D2D UE, and a UE that receives or desires to receive data from the transmitting D2D UE will be referred to as a receiving D2D UE. When there are a plurality of receiving D2D UEs to receive or desire to receive data from the transmitting D2D UE, the plurality of receiving D2D UEs may be distinguished through prefixes "first" to "N-th". Furthermore, for simplicity, any node at a network end such as an eNB for control connection between D2D UEs or allocation of radio resources to a D2D link, a D2D server, and a connection/session management server will be referred to as a "network."

A D2D UE performing D2D communication needs to pre-confirm existence of D2D UEs which are positioned nearby and capable of transmitting and receiving data in order to transmit data to other D2D UEs through D2D communication. To this end, D2D peer discovery is performed. The D2D UE performs D2D search within a discovery interval, and all D2D UEs may share the discovery interval. The D2D UE may monitor the logical channels of a search region within the discovery interval and receive D2D discovery signals transmitted by other D2D UEs. D2D UEs receiving the transmitted signals of other D2D UEs generates a list of adjacent D2D UEs by using the received signals. In addition, the D2D UEs may broadcast their information (i.e., an identifier) within the search interval and other D2D UE may receive the broadcast D2D discovery signal, thereby recognizing that the corresponding D2D UE is within a range where the D2D UE is capable of performing D2D communication.

Information for D2D search may be broadcast periodically. In addition, such broadcast timing may be predetermined by a protocol and signaled to the D2D UEs. In addition, the D2D UE may transmit/broadcast signals during a portion of the discovery interval, and each D2D UE may monitor signals that are potentially transmitted by other D2D UEs in the remaining part of the D2D discovery interval.

For example, the D2D discovery signal may be a beacon signal. Also, the D2D discovery intervals may include a plurality of symbols (e.g., OFDM symbols). The D2D UE may select at least one symbol in the D2D discovery interval and transmit/broadcast a D2D discovery signal. The D2D UE may also transmit a signal corresponding to one tone in a symbol selected by the D2D UE.

After the D2D UEs discover each other through the D2D discovery procedure, the D2D UEs may perform a connection establishment procedure. For example, in FIG. 1, a first device 102 and a second device 106 may be linked to each other through the connection procedure. Thereafter, the first device 102 may transmit traffic to the second device 106 using the D2D link 108. The second device 106 may also transmit traffic to the first device 102 using the D2D link 108.

Figure 11:
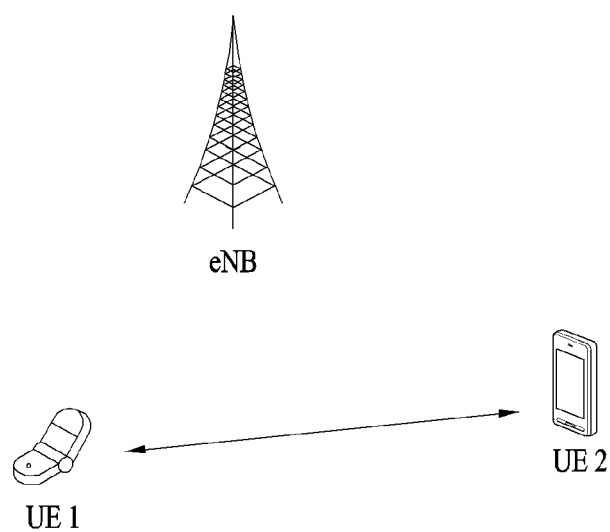
FIG. 11 shows a simplified D2D communication network.

FIG. 11 shows a simplified D2D communication network.

In FIG. 11, D2D communication is performed between UEs (UE1 and UE2) supporting D2D communication. Generally, a user equipment (UE) refers to a UE of a user. However, if a network equipment such as an evolved Node B (eNB) transmits/receives signals according to a communication scheme for UEs (UE 1 and UE 2), it may also be regarded as an eNB or a UE.

UE1 may operate to select a resource unit corresponding to a specific resource in a resource pool, which means a set of resources, and to transmit a D2D signal using the resource unit. UE2, which serves as a receiving UE may receive configuration of a resource pool in which UE1 may transmit signals and detect a signal of UE1 in the corresponding pool. For example, if UE1 is within the connection coverage of the eNB, the eNB may signal the resource pool. Further, for example, when UE1 is outside the connection coverage of the eNB, another UE may notify UE1 of the resource pool or UE1 may determine the resource pool based on predetermined resources. Generally, a resource pool includes a plurality of resource units, and each UE may select one or more resource units and use the same for transmission of its own D2D signal.

Figure 12:
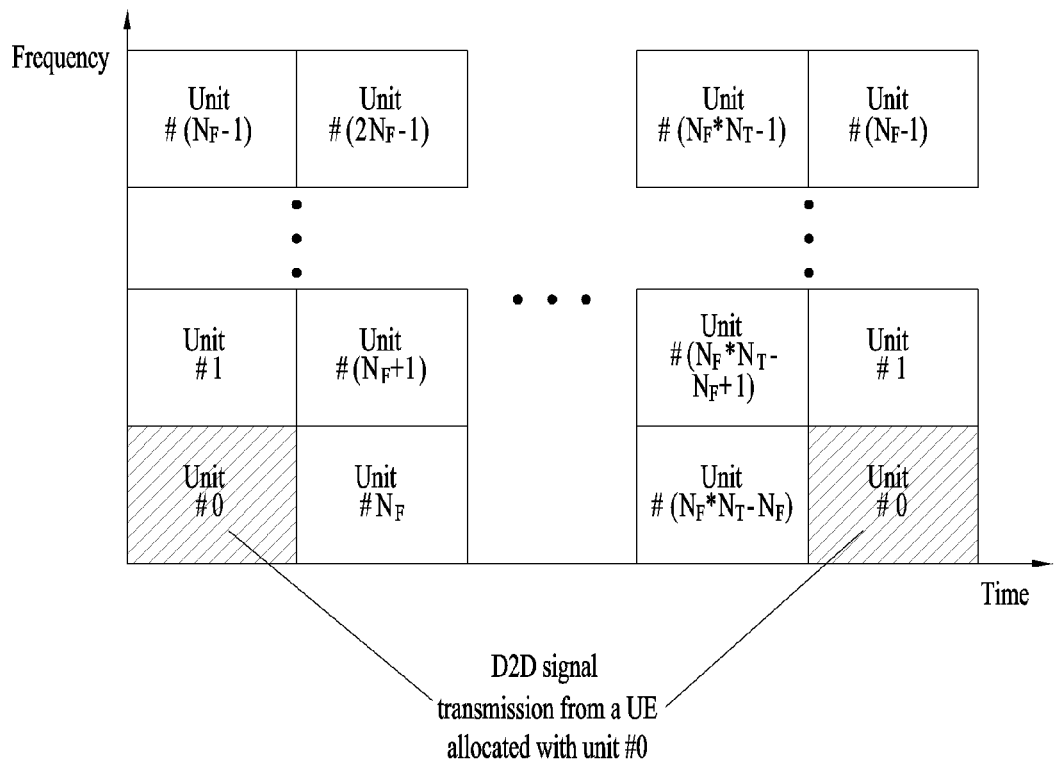
FIG. 12 illustrates configuration of a resource unit according to an embodiment.

FIG. 12 illustrates configuration of a resource unit according to an embodiment.

In FIG. 12, the vertical axis represents frequency resources, and the horizontal axis represents time resources. Also, a radio resource is divided into $N_T$ parts in the time domain to construct $N_T$ subframes. In addition, since the frequency resource is divided into $N_F$ parts in one subframe, one subframe may include $N_T$ symbols. Thus, a total of $N_F * N_T$ resource units may be configured as a resource pool.

The D2D transmission resource (Unit #0) allocated to unit number 0 is repeated every $N_T$ subframes. Thus, in the embodiment of FIG. 12, the resource pool may be repeated with a cycle of $N_T$ subframes. As shown in FIG. 12, the specific resource unit may be repeated periodically. In addition, in order to obtain a diversity effect in the time dimension or frequency dimension, an index of a physical resource unit to which one logical resource unit is mapped may be changed according to a predetermined pattern. For example, the logical resource unit may be hopped in the time domain and/or frequency domain according to a predetermined pattern in an actual physical resource unit. In FIG. 12, the resource pool may mean a set of resource units that a UE desiring to transmit a D2D signal may use to transmit a signal.

The resource pools described above may be subdivided into different types. For example, resource pools may be divided according to the content of the D2D signal transmitted in each resource pool. For example, the content of a D2D signal may be classified as described below, and a separate resource pool may be configured for each item of content.

Scheduling Assignment (SA): SA (or SA information) may include the location of a resource used by each transmitting UE for transmission of a subsequent D2D data channel, and a modulation and coding scheme necessary for demodulation of the other data channels, and/or a Multiple Input Multiple Output (MIMO) transmission scheme. In addition, the SA information may include a User Equipment Identifier of a target UE to which each transmitting UE intends to transmit data. A signal containing the SA information may be multiplexed with the D2D data on the same resource unit and transmitted. In this case, the SA resource pool may refer to a pool of resources in which the SA is multiplexed and transmitted with the D2D data.

D2D Data Channel: The D2D data channel may refer to a pool of resources used by a transmitting UE to transmit user data using a resource designated through scheduling assignment. If the scheduling assignment is allowed to be multiplexed and transmitted together with the D2D resource data on the same resource unit, only the D2D data channel of the form excluding the scheduling assignment information may be transmitted in the resource pool for the D2D data channel. That is, on the individual resource units in the SA resource pool, a resource element for transmitting the SA information may be used for transmission of the D2D data on the resource pool of the D2D data channel.

Discovery Message: The discovery message resource pool may refer to a resource pool for transmitting a discovery message that allows the transmitting UE to transmit information such as its own ID (Identifier) to enable neighboring UEs to discover the transmitting UE.

As described above, the D2D resource pools may be classified according to the content of the D2D signal. However, even if the contents of the D2D signals are the same, a different resource pool may be used depending on the transmission/reception property of the D2D signal. For example, even if the same D2D data channel or discovery message is used, different resource pools may be distinguished according to a transmission timing determination method for the D2D signal (e.g., whether the D2D signal is transmitted at a reception time of a synchronization reference signal, or transmitted at the reception timing by applying a certain timing advance), a resource allocation scheme (for example, whether the eNB assigns the transmission resource of an individual signal to an individual transmitting UE or whether the transmitting UE itself selects a transmission resource of an individual signal in a resource pool), or a signal format (e.g., the number of symbols occupied by each D2D signal in one subframe or the number of subframes used for transmission of one D2D signal).

As described above, a UE that desires to transmit data using D2D communication may first select an appropriate resource from the SA resource pool and transmit its scheduling assignment (SA) information. For example, as a criterion of selection of an SA resource pool, an SA resource associated with a resource which is not used for transmission of SA information and/or a resource which is expected not to have data transmission in a subframe following transmission of SA information of another UE may be selected as an SA resource pool. The UE may also select an SA resource associated with a data resource that is expected to have a low interference level. In addition, the SA information may be broadcast. Therefore, the UEs in the D2D communication system may receive the broadcast SA information. In the following description, the term "transmission" or "transmitting" may be replaced by "broadcast".

Figure 13:
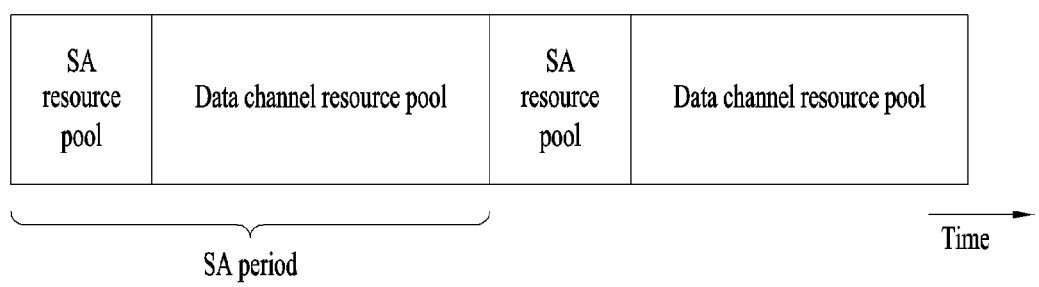
FIG. 13 illustrates a periodic SA resource pool according to an embodiment.

FIG. 13 illustrates a periodic SA resource pool according to an embodiment.

For example, an SA resource pool may precede a series of D2D data channel resource pools. The UE first attempts to detect the SA information, and when existence of data that the UE needs to receive is discovered, the UE may attempt to receive the data on a data resource associated therewith. For example, the resource pool may include a preceding SA resource pool and a following data channel resource pool, as shown in FIG. 13. As shown in FIG. 13, the SA resource pool may appear periodically. In the following description, the period in which the SA resource pool appears may be referred to as an SA period.

PUSCH Frequency Hopping

Hereinafter, physical uplink shared channel (PUSCH) frequency hopping used on uplink of the current LTE communication system will be described.

PUSCH hopping used in the LTE/LTE-A system may be classified into Type 1 PUSCH hopping and Type 2 PUSCH hopping. Type 1 PUSCH hopping may be determined to be one of ¼, −¼ or ½ hopping of the hopping bandwidth according to a hopping bit indicated by the uplink grant Downlink Control Information (DCI). More specifically, a physical resource block (PRB) having the lowest index in the first slot of the subframe i for PUSCH resource allocation (RA) is $n_{PRB}^{S1}(i)=RB_{START}$, and may be acquired from the uplink grant. Once the lowest PRB index of the first slot is determined, the position of $n_{PRB}(i)$, which is the lowest PRB index in the second slot of subframe I, may be determined according to Equation 14 and Table 3 below.

$$\begin{cases} n_{PRB}^{S1}(i) = \tilde{n}_{PRB}^{S1}(i) + \tilde{N}_{RB}^{HO}/2 \\ n_{PRB}(i) = \tilde{n}_{PRB}(i) + \tilde{N}_{RB}^{HO}/2 \end{cases} \quad \text{Equation 14}$$

TABLE 3

| System BW $N_{RB}^{UL}$ | Number of Hopping bits | Information in hopping bits | $\tilde{n}_{PRB}(i)$ |
|---|---|---|---|
| 6-49 | 1 | 0 | $(\lfloor N_{RB}^{PUSCH}/2 \rfloor + \tilde{n}_{PRB}^{S1}(i)) \bmod N_{RB}^{PUSCH}$ |
|  |  | 1 | Type 2 PUSCH Hopping |
| 50-110 | 2 | 00 | $(\lfloor N_{RB}^{PUSCH}/4 \rfloor + \tilde{n}_{PRB}^{S1}(i)) \bmod N_{RB}^{PUSCH}$ |
|  |  | 01 | $(-\lfloor N_{RB}^{PUSCH}/4 \rfloor + \tilde{n}_{PRB}^{S1}(i)) \bmod N_{RB}^{PUSCH}$ |
|  |  | 10 | $(\lfloor N_{RB}^{PUSCH}/2 \rfloor + \tilde{n}_{PRB}^{S1}(i)) \bmod N_{RB}^{PUSCH}$ |
|  |  | 11 | Type 2 PUSCH Hopping |

In Equation 14, $N_{RB}^{HO}$, which denotes a PUSCH-hopping offset, is provided from an higher layer. If $N_{RB}^{HO}$ is an odd number, $\tilde{N}_{RB}^{HO}=N_{RB}^{HO}+1$. If $N_{RB}^{HO}$ is an even number, $\tilde{N}_{RB}^{HO}=N_{RB}^{HO}$. In Table 3, $N_{RB}^{PUSCH}$, which denotes the number of PUSCH resource blocks, may indicate the bandwidth of frequency hopping.

The hopping mode provided from the higher layer may determine whether the PUSCH frequency hopping is "inter-subframe" hopping or "intra and inter-subframe" hopping. When the hopping mode is the inter-subframe mode, if the value of CURRENT_TX_NB is an even number, the PUSCH resource allocation conforms to resource allocation of the first slot. If the value of CURRENT_TX_NB is an odd number, the PUSCH resource allocation may conform to resource allocation of the second slot. CURRENT_TX_NB indicates the number of transmissions of a transport block through higher layer signaling.

Figure 14:
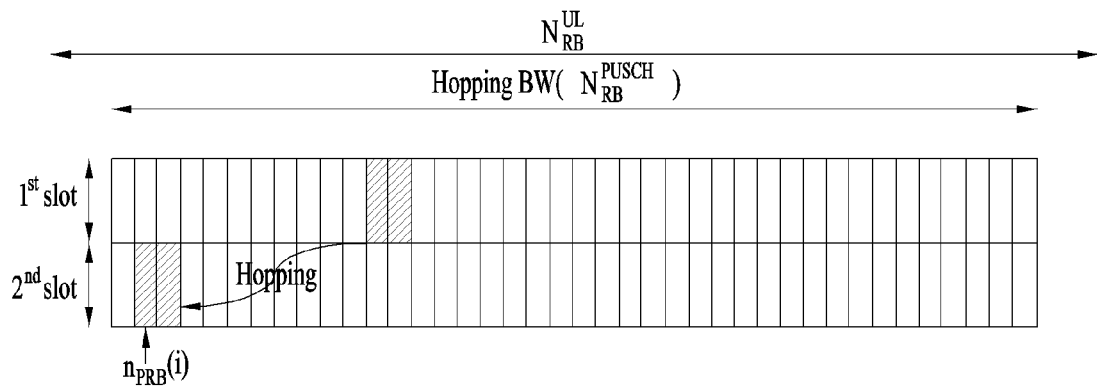
FIG. 14 illustrates an example of type 1 PUSCH hopping.

FIG. 14 illustrates an example of type 1 PUSCH hopping.

In FIG. 14, the hopping bit has a value of 01. Accordingly, $\tilde{n}_{PRB}(i)$ is $(-\lfloor N_{RB}^{PUSCH}/4 \rfloor + \tilde{n}_{PRB}^{S1}(i)) \bmod N_{RB}^{PUSCH}$. Referring to Equation 14, $\tilde{n}_{PRB}(i)$, which is a PRB number of the second slot hopped by the −¼ hopping bandwidth ($N_{RB}^{PUSCH}$) from the lowest PRB number of the first slot, may be calculated.

Type 2 PUSCH hopping, which is sub-band based hopping, may be determined by Equation 15 below. a PRB number in slot $n_s$ may be calculated in Equation 15.

$$\tilde{n}_{PRB}(n_s) = \quad \text{Equation 15}$$
$$(\tilde{n}_{VRB} + f_{hop}(i) \cdot N_{RB}^{sb} + ((N_{RB}^{sb} - 1) - 2(\tilde{n}_{VRB} \bmod N_{RB}^{sb})) \cdot$$
$$f_m(i)) \bmod (N_{RB}^{sb} \cdot N_{sb})$$

$$i = \begin{cases} \lfloor n_s/2 \rfloor & \text{inter-subframe hopping} \\ n_s & \text{intra and inter-subframe hopping} \end{cases}$$

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}$$

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}$$

In Equation 15, $N_{sb}$ is the number of subbands provided by higher layer signaling, and may be obtained from a scheduling grant. $N_{RB}^{HO}$, which is a PUSCH hopping offset (pusch-HoppingOffset), is provided from an higher layer.

$N_{sb}$ is the number of subbands signaled from the upper layer, and the number of resource blocks of each subband $N_{RB}^{sb}$ may be calculated by Equation 16.

$$N_{RB}^{sb} = \begin{cases} N_{RB}^{UL} & N_{sb} = 1 \quad \text{Equation 16} \\ \lfloor (N_{RB}^{UL} - N_{RB}^{HO} - N_{RB}^{HO} \bmod 2)/N_{sb} \rfloor & N_{sb} > 1 \end{cases}$$

$N_{RB}^{UL}$ denotes the number of uplink resource blocks.

The hopping function $f_{hop}(i)$ is expressed by Equation 17 below.

$$f_{hop}(i) = \begin{cases} 0 & N_{sb} = 1 \quad \text{Equation 17} \\ \left(f_{hop}(i-1) + \sum_{k=i\cdot 10+1}^{i\cdot 10+9} c(k) \times 2^{k-(i\cdot 10+1)}\right) \bmod N_{sb} & N_{sb} = 2 \\ \left(f_{hop}(i-1) + \left(\sum_{k=i\cdot 10+1}^{i\cdot 10+9} c(k) \times 2^{k-(i\cdot 10+1)}\right) \bmod (N_{sb}-1) + 1\right) \bmod N_{sb} & N_{sb} > 2 \end{cases}$$

Further, the mirroring function $f_m(i)$ is expressed by Equation 18 below.

$$f_m(i) = \quad \text{Equation 18}$$
$$\begin{cases} i \bmod 2 & N_{sb} = 1 \text{ and intra and inter-subframe hopping} \\ \text{CURRENT\_TX\_NB} \bmod 2 & N_{sb} = 1 \text{ and inter-subframe hopping} \\ c(i \cdot 10) & N_{sb} > 1 \end{cases}$$

In Equation 18, CURRENT_TX_NB denotes the number of times of transmission of a transport block. c(i) is a pseudo-random sequence. In the case of frame structure type 1, c(i) is initialized as $c_{init}=N_{ID}^{cell}$. In case of frame structure type 2 is initialized as $c_{int}=2^9 \cdot (n_f \bmod 4)+N_{ID}^{cell}$ at the beginning of each frame. For c(i), Section 7.2 of 3GPP TS 36.211 may be referenced.

In Type 2 PUSCH hopping, hopping and mirroring are performed on a subband basis according to the hopping function $f_{hop}(i)$. Mirroring is applied in a way that reverses the order of the resources used in the subband. As described in Equation 17, the hopping function may be determined based on the pseudo-random sequence c(k). Herein, the pseudo-random sequence c(k) is a function of cell ID and the mirroring pattern is also a function of cell ID. Therefore, all UEs in the same cell have the same hopping pattern. That is, cell-specific mirroring may be applied to Type 2 PUSCH hopping.

Figure 15:
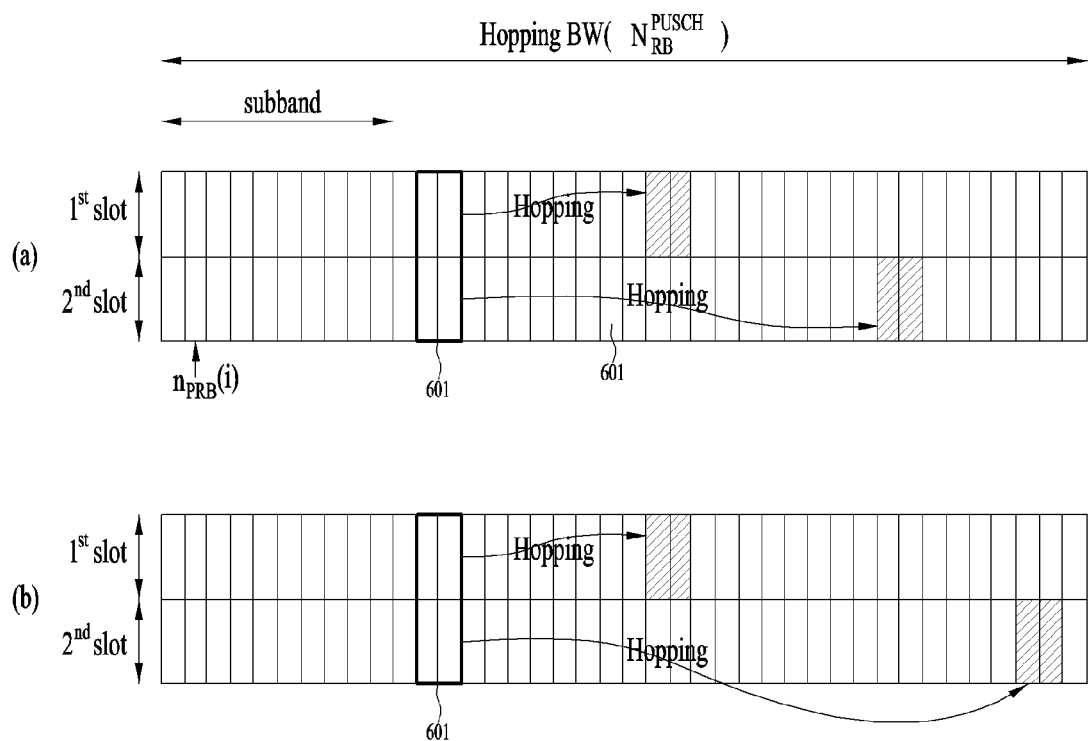
FIG. 15 illustrates an example of type 2 PUSCH hopping.

FIG. 15 illustrates an example of type 2 PUSCH hopping.

In FIG. 15, type 2 PUSCH hopping when the number of subbands $N_{sb}$ is 4 is illustrated. In FIG. 15(a), hopping is performed by one subband for the first slot and two subbands for the second slot with respect to a virtual resource block 601. In FIG. 15(b), mirroring is applied to the second slot.

In D2D communication, in order to obtain frequency diversity, frequency hopping may be applied in determining a transmission resource block. However, if the above-described PUSCH frequency hopping pattern of LTE/LTE-A is applied to D2D communication, the following issues may be raised. In the current D2D communication, only the inter-subframe hopping is used. Therefore, to use the LTE type 1 PUSCH hopping pattern described above, determination of a hopping pattern by CURRENT_TX_NB needs to be corrected. For example, the value of CURRENT_TX_NB may be replaced with a subframe value. For example, the even subframes may conform to the hopping pattern of the first slot of LTE type 1 PUSCH hopping and the odd subframes may conform to the hopping pattern of the second slot of LTE type 1 PUSCH hopping. Also, as described above, a D2D resource pool may be configured, and when frequency hopping is performed within the configured D2D resource pool, the bandwidth and offset ($N_{RB}^{HO}$ or $\tilde{N}_{RB}^{HO}$) of frequency hopping need to be modified. In the following description, a D2D resource pool may refer to a resource block pool.

Embodiment 1

When there is a frequency pool configured in D2D communication, the equations of the LTE PUSCH frequency hopping described above may be changed such that the D2D signals may be frequency-hopped within the configured frequency pool. For example, when an LTE type 1 PUSCH hopping pattern or an LTE type 2 PUSCH hopping pattern is applied to D2D communication, the bandwidth of frequency hopping may be configured from the start PRB of the D2D resource pool having a contiguous frequency band to the end PRB of the D2D resource pool. In addition, for example, the frequency hopping offset may be set to twice the numeric value of the start PRB of the D2D resource pool having a contiguous frequency bandwidth.

For example, in the following description, the smallest PRB number of a D2D resource pool (e.g., a D2D resource pool with a contiguous frequency band) may be defined as $n_{PRBSTART}^{D2D}$, and the largest PRB number of the D2D resource pool may be defined as $n_{PRBEND}^{D2D}$.

Embodiment 1-1

For the LTE type 1 PUSCH hopping pattern, the hopping bandwidth $N_{RB}^{PUSCH}$ may be defined as $N_{RB}^{PUSCH} = n_{PRBEND}^{D2D} - n_{PRBSTART}^{D2D} + 1$.

Embodiment 1-2

For the LTE type 1 PUSCH hopping pattern, the hopping offset $\tilde{N}_{RB}^{HO}$ may be defined $\tilde{N}_{RB}^{HO} = N_{RB}^{HO} = 2 \times n_{PRBSTART}^{D2D}$.

Embodiment 1-3

For the LTE type 2 PUSCH hopping pattern, Equation 16 described above may be replaced by Equation 19 below.

$$N_{RB}^{sb} = \begin{cases} N_{RB}^{PUSCH} & N_{sb} = 1 \\ \lfloor N_{RB}^{PUSCH} / N_{sb} \rfloor & N_{sb} > 1 \end{cases} \quad \text{Equation 19}$$

In Equation 19, $N_{RB}^{PUSCH}$ may be defined as $N_{RB}^{PUSCH} = n_{PRBEND}^{D2D} - n_{PRBSTART}^{D2D} + 1$.

Embodiment 1-4

For the LTE type 2 PUSCH hopping pattern, the hopping offset $N_{RB}^{HO}$ may be defined as $N_{RB}^{HO} = 2 \times n_{PRBSTART}^{D2D}$.

Embodiment 1-5

For the LTE type 2 PUSCH hopping pattern, $$i = \begin{cases} \lfloor n_s / 2 \rfloor & \text{inter-subframe hopping} \\ n_s & \text{intra and inter-subframe hopping} \end{cases}$$

in Equation 15 may be replaced with $i = \lfloor n_s/2 \rfloor$.

Figure 16:
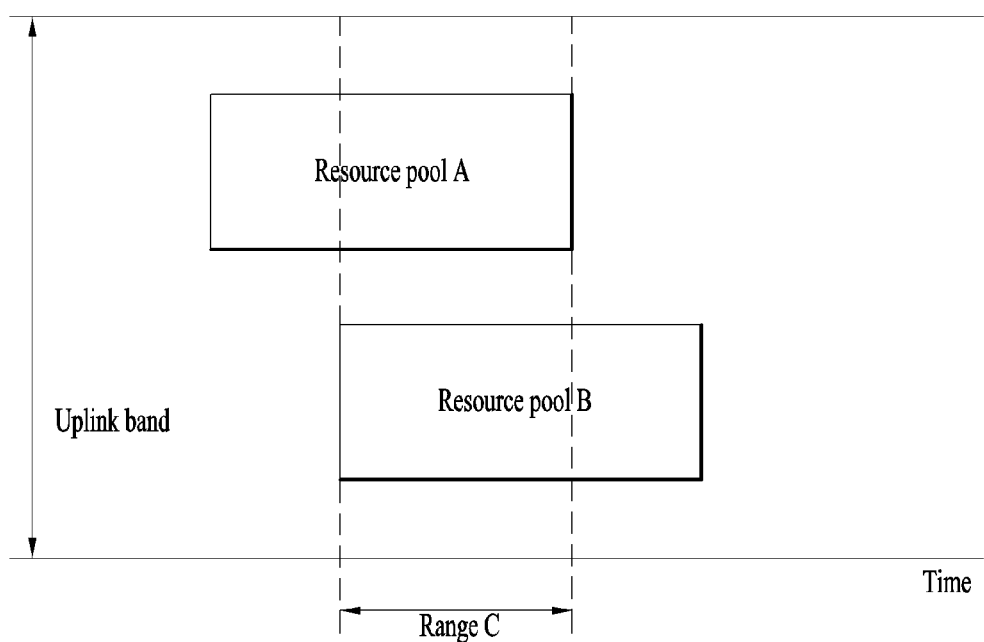
FIG. 16 illustrates a D2D resource pool according to an embodiment.

FIG. 16 illustrates a D2D resource pool according to an embodiment.

Multiple D2D resource pools may be co-located in the frequency domain for a period of time. For example, as shown in FIG. 16, there may be two D2D resource pools. The two resource pools overlap in time range C. In this case, in the case where resource pool A and resource pool B perform frequency hopping only in the resource pool of itself, frequency hopping may be performed according to Embodiment 1 to Embodiment 1-5 described above. However, in order to obtain higher frequency diversity, the data in the resource pool may be hopped as they are transferred to different frequency pools. For example, in FIG. 16, data in resource pool A may be hopped between resource pools A and B every subframe.

Embodiment 2

In the following embodiments, frequency hopping between resource pools is described. In the following description, two or more resource pools overlap each other within a specific time range. The number of resource pools between which frequency hopping is performed among mutually overlapping resource pools is defined as $N_R$ ($N_R \geq 2$). $N_R$ resource pools may not consist of contiguous frequency resources. Each of the $N_R$ frequency pools may be configured as an independent resource pool. Also, the $N_R$ frequency pools may be a part of one resource pool consisting of non-contiguous frequency resources in the frequency domain, with each part having contiguous frequency resources.

Embodiment 2-1

$N_R$ frequency pools between which frequency hopping is performed may be predefined or may be announced to the UE by Radio Resource Control (RRC) signaling. The size of the band of the frequency pool having the smallest frequency band among the frequency pools may be defined as $N_{min,frequency}$. In this case, frequency hopping may be applied only to frequency bands corresponding to $N_{min,frequency}$ among $N_R$ frequency pools. This limitation is intended to prevent the frequency band of hopped data from exceeding the frequency band of a frequency pool (e.g., a frequency pool having a frequency band of size $N_{min,frequency}$) when frequency hopping is applied to a frequency band of a larger size.

Embodiment 2-2

$N_R$ frequency pools among which frequency hopping is performed mutually may be arranged from a frequency pool having the start PRB whose index is the smallest among the frequency pools. For example, the resource pools may be indexed as resource pool 1, resource pool 2, . . . , resource pool $N_R$−1, starting with a resource pool having the smallest start PRB index. Data to be hopped in each resource pool i (i=0, 1, 2, . . . , −1) may be hopped to the resource pool (i+$N_{hopping}$)mod $N_R$ in the next subframe. Here, $N_{hopping}$ may be announced to the UE through higher layer signaling or DCI, or may be preset. The data to be hopped may be hopped according to the value of CURRENT_TX_NB described above.

Also, for data hopped to another resource pool, mirroring may be applied within the hopped resource pool. In addition, for data hopped to another resource pool, the modified LTE type 1/2 PUSCH hopping described above in connection with Embodiments 1 to 1-5 may be applied to data hopped to another resource pool.

Embodiment 2-3

$N_R$ frequency pools among which frequency hopping is performed mutually may be sorted in ascending order of the index of each start PRB thereof. the resource pools may be indexed (or re-indexed) as resource pool 1, resource pool 2, . . . , resource pool $N_R$−1, starting with a resource pool having the smallest start PRB index. PRBs in the D2D resource pool may be assigned a virtual PRB index (or number) leading from resource pool 0 to resource pools having contiguous numbers. For example, PRB indexes 0 and 1 may be used for uplink signal transmission, PRB indexes 2, 3 and 4 are used for D2D resource pool 0, PRB indexes 5, 6 and 7 are used to transmit uplink signals, and PRB indexes 8, 9, and 10 may be used for D2D resource pool 1. Thus, contiguous D2D resource pool 0 and D2D resource pool 1 whose numbers are contiguous include PRB indexes 2, 3, 4, 8, 9, and 10. In this case, 0, 1, 2, 3, 4, and 5, which are virtual PRB numbers (indexes), may be given to PRB indexes 2, 3, 4, 8, 9, and 10. Therefore, a virtual PRB number starts in D2D resource pool 0, and a contiguous virtual PRB numbers may be given between the D2D resource pools. That is, the resource blocks of the D2D resource pools may be arranged in ascending order of resource block number in the resource pool.

For example, the virtual PRB number $n_{D2DVRB}$ may be modified according to $n_{D2DVRB}' \rightarrow (n_{D2DVRB} + N_{hopping,RB})$ mod $N_\Sigma$. Herein, $N_\Sigma$ is the sum of frequency bands of $N_R$ resource pools among which frequency hopping is performed mutually, $N_{hopping,RB}$ is a unit of resource blocks in which hopping is performed. $N_{hopping,RB}$ may be set to the maximum value or minimum value of the frequency bandwidth of each of $N_R$ resource pools in which hopping is performed. $N_{hopping,RB}$ may be provided to the UE via higher layer signaling or DCI, or may be a predetermined value.

The modified virtual PRB numbers are mapped to actual PRB numbers according to the above description. For example, PRB indexes 0 and 1 may be used for uplink signal transmission, PRB indexes 2, 3 and 4 may be used for D2D resource pool 0, and PRB indexes 5, 6, and 7 may be used for uplink signal transmission, and PRB indexes 8, 9, and 10 may be used for D2D resource pool 1. In this case, 0, 1, 2, 3, 4, and 5, which are virtual PRB numbers (indexes), may be given to PRB indexes 2, 3, 4, 8, 9, and 10. Thereafter, the virtual PRB numbers may be modified to $n_{D2DVRB}'$, virtual PRB numbers 0, 1, 2, 3, 4, and 5 modified as described above. The modified virtual PRB numbers $n_{D2DVRB}'$, 0, 1, 2, 3, 4, and 5, may be mapped to actual PRB numbers 2, 3, 4, 8, 9, and 10.

Embodiment 2-4

Regarding Embodiments 2-1 to 2-3 described above, for example, a case where there are two D2D resource pools or a case where one D2D resource pool is composed of two resource regions having contiguous frequencies will be described. When frequency hopping is performed only in two resource pools (or two resource regions), the above-described LTE type 1/2 PUSCH hopping pattern is modified as in Embodiments 2-4-1 to 2-4-5 described below and applied. In the following description, the smaller value of the start PRB indexes of the two D2D resource pools (or two resource regions) is defined as $n_{PRBSTART}^{D2D,0}$, and the greater value is defined asn $n_{PRBSTART}^{D2D,1}$.

Embodiment 2-4-1

For the LTE type 1 PUSCH hopping pattern, the hopping bandwidth $N_{RB}^{PUSCH}$ may be defined as $N_{RB}^{PUSCH} = 2 \times (n_{PRBSTART}^{D2D,1} - n_{PRBSTART}^{D2D,0})$.

Embodiment 2-4-2

For the LTE type 1 PUSCH hopping pattern, the hopping offset $\tilde{N}_{RB}^{HO}$ may be defined as $\tilde{N}_{RB}^{HO} = N_{RB}^{HO} = 2 \times n_{PRBSTART}^{D2D,0}$.

Embodiment 2-4-3

For the LTE type 1 PUSCH hopping pattern, $\tilde{n}_{PRB}(i)$ may be defined as $\tilde{n}_{PRB}(i) = (\lfloor N_{RB}^{PUSCH}/2 \rfloor + \tilde{n}_{PRB}^{S1}(i)) \mod N_{RB}^{PUSCH}$ or $\tilde{n}_{PRB}(i) = (-\lfloor N_{RB}^{PUSCH}/2 \rfloor + \tilde{n}_{PRB}^{S1}(i)) \mod N_{RB}^{PUSCH}$.

Embodiment 2-4-4

For the LTE type 2 PUSCH hopping pattern, Equation 16 may be replaced by Equation 20 below.

$$N_{RB}^{sb} = \begin{cases} N_{RB}^{PUSCH} & N_{sb} = 1 \\ \lfloor N_{RB}^{PUSCH}/N_{sb} \rfloor & N_{sb} > 1 \end{cases} \quad \text{Equation 20}$$

In Equation 20, $N_{RB}^{PUSCH} = 2 \times (n_{PRBSTART}^{D2D,1} - n_{PRBSTART}^{D2D,0})$.

Embodiment 2-4-5

For the LTE type 2 PUSCH hopping pattern, the hopping offset $N_{RB}^{HO}$ may be defined as $N_{RB}^{HO} = 2 \times n_{PRBSTART}^{D2D,0}$.

Embodiment 2-5

A virtual resource space configured only by D2D resource pools may created, and the modified LTE type 1/2 PUSCH hopping may be performed within the virtual resource space. Then, the virtual resource space may be mapped back to the physical resource space. For example, the indexes of start PRBs of $N_R$ resource pools in which frequency hopping is performed mutually may be arranged in ascending order from the smallest one. The resource pools may be indexed as resource pool 1, resource pool 2, ..., resource pool $N_R-1$ from the resource pool whose start PRB has the smallest index. PRBs in the D2D resource pool may be assigned a virtual PRB index (or number) leading from resource pool 0 to resource pools having contiguous numbers. For example, PRB indexes 0 and 1 may be used for uplink signal transmission, PRB indexes 2, 3 and 4 are used for D2D resource pool 0, PRB indexes 5, 6 and 7 are used to transmit uplink signals, and PRB indexes 8, 9, and 10 may be used for D2D resource pool 1. Thus, D2D resource pool 0 and D2D resource pool 1 whose numbers are contiguous include PRB indexes 2, 3, 4, 8, 9, and 10. In this case, 0, 1, 2, 3, 4, and 5, which are virtual PRB numbers (indexes), may be given to PRB indexes 2, 3, 4, 8, 9, and 10. Therefore, a virtual PRB number starts in D2D resource pool 0, and a contiguous virtual PRB numbers may be given between the D2D resource pools.

In this case, LTE type 1 PUSCH hopping may be used by modifying the equation of the LTE type 1 PUSCH hopping as $\tilde{N}_{RB}^{HO} = N_{RB}^{HO} = 0$ and $N_{RB}^{PUSCH} = N_\Sigma$. $N_\Sigma$ is the sum of the frequency bands of $N_R$ resource pools in which frequency hopping is performed mutually.

LTE type 2 PUSCH hopping may also be used by replacing Equation 16 of the above-described LTE Type 2 PUSCH hopping with Equation 21 below and modifying the Equation 21 with $N_{RB}^{PUSCH} = N_\Sigma$ and $N_{RB}^{HO} = 0$.

$$N_{RB}^{sb} = \begin{cases} N_{RB}^{PUSCH} & N_{sb} = 1 \\ \lfloor N_{RB}^{PUSCH}/N_{sb} \rfloor & N_{sb} > 1 \end{cases} \quad \text{Equation 21}$$

The modified virtual PRB numbers may be mapped to the actual PRB numbers again as described above. For example, PRB indexes 0 and 1 may be used for uplink signal transmission, PRB indexes 2, 3 and 4 are used for D2D resource pool 0, PRB indexes 5, 6 and 7 are used to transmit uplink signals, and PRB indexes 8, 9, and 10 may be used for D2D resource pool 1. In this case, the virtual PRB numbers 0, 1, 2, 3, 4 and 5 assigned to the actual PRB indexes 2, 3, 4, 8, 9 and 10 may be hopped according to the modified LTE type 1/2 PUSCH hopping and converted into modified virtual PRB numbers. The modified virtual PRB numbers 0, 1, 2, 3, 4, and 5 may be mapped to actual PRB numbers 2, 3, 4, 8, 9, and 10, respectively.

Embodiment 3

When the frequency hopping rule is followed in D2D communication, the hopped transmission data may be outside of the resource pool. In this case, the transmission data out of the resource pool due to frequency hopping may be dropped. That is, the transmission data may be transmitted only on the corresponding frequency resource.

Further, if the data hopped according to the frequency hopping rule in D2D communication cannot be transmitted on contiguous frequency resources, the data may be dropped. That is, the data may be configured to be transmitted on contiguous frequency resources. In other words, transmission of data from the UE in D2D communication may occur only on contiguous frequency resources (i.e., contiguous PRBs).

For example, PRB indexes 0 and 1 may be used for uplink signal transmission, PRB indexes 2, 3 and 4 are used for D2D resource pool 0, PRB indexes 5, 6 and 7 are used to transmit uplink signals, and PRB indexes 8, 9, and 10 may be used for D2D resource pool 1. In this case, the data of PRB indexes 2, 3, and 4 may be transmitted only within the D2D resource pool 0. That is, if the data of the hopped PRB indexes 2, 3, and 4 are mapped to the actual PRB indexes 5, 6, and 7, transmission of the corresponding data may be dropped.

The embodiments described above are constructed by combining elements and features of the present invention in a predetermined form. The elements or features should be considered selective unless explicitly mentioned otherwise. Each of the elements or features can be implemented without being combined with other elements. In addition, some elements and/or features may be combined to configure an embodiment of the present invention. The ordering of the operations discussed in the embodiments of the present invention may be changed. Some elements or features of one embodiment may also be included in another embodiment, or may be replaced by corresponding elements or features of another embodiment. It is apparent that claims that are not explicitly cited in each other in the appended claims may be presented in combination as an embodiment of the present invention or included as a new claim by subsequent amendment after the application is filed.

The present invention may be carried out in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

Although a method for determining a transmission resource block pool of a terminal in D2D (Device to Device) communication and an apparatus therefor have been described with reference to examples applied to the 3GPP LTE system, they are applicable to various wireless communication systems other than the 3GPP LTE system.

The invention claimed is:

1. A method for transmitting a device-to-device (D2D) signal by a user equipment (UE) in D2D communication, the method comprising:
performing frequency hopping to indexes of physical resource blocks (PRBs) in a resource block pool based on a predefined hopping pattern,
wherein the PRBs in the resource block pool is used for transmitting the D2D signal;
transmitting the D2D signal based on the indexes of PRBs,
wherein the resource block pool includes two resource regions,
wherein the two resource regions are obtained based on an index of a first PRB of the resource block pool and an index of a last PRB of the resource block pool, and
wherein the indexes of the first PRB and the last PRB are informed by higher layer signaling.

2. The method according to claim 1, wherein a PRB having a lower index than the first PRB is used for transmitting an uplink signal.

3. The method according to claim 1, wherein a PRB having a higher index than the last PRB is used for transmitting an uplink signal.

4. The method according to claim 1, wherein the PRBs in the resource block pool are arranged in ascending order of PRB indexes.

5. The method according to claim 1, wherein PRBs of a first resource region of the two resource regions are not contiguous with PRBs of a second resource region of the two resource regions.

6. The method according to claim 1, wherein the predefined hopping pattern is Long Term Evolution (LTE) type 1 Physical Uplink Shared Channel (PUSCH) hopping or LTE type 2 PUSCH hopping.

7. A communication device for transmitting a device-to-device (D2D) signal in D2D communication, the communication device comprising:
a memory; and
a processor connected with the memory;
wherein the processor is configured to control to:
perform frequency hopping to indexes of physical resource blocks (PRBs) in a resource block pool based on a predefined hopping pattern,
wherein the PRBs in the resource block pool is used for transmitting the D2D signal;
transmitting the D2D signal based on the indexes of PRBs,
wherein the resource block pool includes two resource regions,
wherein the two resource regions are obtained based on an index of a first PRB of the resource block pool and an index of a last PRB of the resource block pool, and
wherein the indexes of the first PRB and the last PRB are informed by higher layer signaling.

8. The communication device according to claim 7, wherein a PRB having a lower index than the first PRB is used for transmitting an uplink signal.

9. The communication device according to claim 7, wherein a PRB having a higher index than the last PRB is used for transmitting an uplink signal.

10. The communication device according to claim 7, wherein the PRBs in the resource block pool are arranged in ascending order of PRB indexes.

11. The method according to claim 7, wherein PRBs of a first resource region of the two resource regions are not contiguous with PRBs of a second resource region of the two resource regions.

12. The method according to claim 7, wherein the predefined hopping pattern is Long Term Evolution (LTE) type 1 Physical Uplink Shared Channel (PUSCH) hopping or LTE type 2 PUSCH hopping.

* * * * *